C. L. TOMLINSON.
MIRROR.
APPLICATION FILED APR. 16, 1917.
1,372,258.
Patented Mar. 22, 1921.
Witnesses:-
Mary Scott Tomlinson.
A. Musgrove Roberts.
Inventor
Clarence L. Tomlinson
By George W. Dorr
Attorney

UNITED STATES PATENT OFFICE.

CLARENCE L. TOMLINSON, OF NEW YORK, N. Y.

MIRROR.

1,372,258.

Specification of Letters Patent.  Patented Mar. 22, 1921.

Application filed April 16, 1917. Serial No. 162,434.

*To all whom it may concern:*

Be it known that I, CLARENCE L. TOMLINSON, a citizen of the United States, residing at 26 Nagle avenue, New York, in the county of New York and State of New York, have invented a new and useful Mirror, of which the following is a specification.

The principal object of this invention is to produce a reflecting surface, such as is employed in mirrors, which will not oxidize, discolor or lose its brilliancy.

Another object is to provide a reflecting surface which is embedded beneath the surface of the glass and therefore absolutely prevent oxidization or decomposition, generally caused by atmospheric conditions, or in some instances by chemical reagents.

The ordinary method of producing a reflecting surface is to apply the nitrate of silver, or similar backing substances, to the surface of the glass and then heat the latter to a cherry red, this drives the volatile elements from the backing and leaves the silver or other substance firmly attached to the outer or exposed surface of the glass. It will be seen that this coated surface is exposed to destruction, such as by scratching, oxidization, etc.

The glass employed in the production of my mirror is one having in its composition a high proportion of lime and therefore has an entirely different action under high temperatures than that made under ordinary formulas. The ordinary glasses, when subjected to sufficient heat become soft and plastic and show a strong and universal tendency to warp and shrink, which would be very detrimental in the production of my mirror. Recent discoveries in the art of glass making have made it possible to produce a type of material that will resist softening in the body of the mass, while its surface becomes plastic or liquid.

To assist those skilled in the art to more fully understand my invention the following description should be read in connection with the attached drawings, in which there is shown a cross sectional view of a vitreous body having incorporated therein a reflecting surface.

In the drawings A indicates the vitreous body and B the reflecting surface.

In the production of a mirror, according to my invention, I take a plate of glass which has in its composition a high proportion of lime, which makes the glass tough and infusible at temperatures not ordinarily employed in making glass until recently. I then take perfectly dry chlorid of gold, silver, platinum, copper or any other metal commonly used to be deposited and to be made free as possible from acid. To this dry chlorid I mix sufficient oil of rosemary and knead the mass until no particle of undecomposed metal chlorid is discoverable, thereby forming a sort of paste. This pasty chlorid mass is then thinned by the addition thereto of about five times its weight of oil of lavender.

I then apply a coat of this thinned metallic chlorid to the polished surface of the plate of glass and place the same on an open plate, heated sufficiently to evaporate the oils used in fluxing said metals and leaving the deposit upon the surface of the glass. This operation is repeated until I have sufficient metal deposited upon the glass. If a retort is used for the purpose of evaporating the oils, it is desired that the same be one of the open type, so as to allow the gases from the flux to escape and therefore leave the surface of the glass clear and bright and free of clouded effects, such as would not be if confined in a retort where the fumes could not escape.

After this particular glass has received the required amount of metal upon its surface, it is placed in an oven that has already been heated to about 900 F., and the temperature suddenly raised to a high degree of heat, past the degree commonly used for rendering the glass a cherry red. The glass with its coated surface is only allowed to remain in the oven during this sudden rise in temperature for a short duration and therefore only the surface is caused to melt, as the heat has not had time to penetrate the major portion of the glass body. The thin filament of melted glass absorbs the metal coating and embodies the same within the body of the glass beneath its surface. It will readily be seen that after the glass is cooled the metal coating is beneath the surface of the glass and therefore absolutely protected from the elements of atmosphere or acid, rendering a perfect reflector which will retain its polish indefinitely.

What I claim is:

1. A vitreous body having embedded therein a reflecting surface.

2. A vitreous body having embedded therein a metallic reflecting surface.

3. A vitreous body having a reflecting surface beneath one of its surfaces.

4. A mirror the reflecting surface of which is entirely surrounded by the vitreous body of the mirror.

5. A mirror having its reflecting surface incorporated within its body.

6. A mirror having a reflecting surface embedded beneath its surface.

7. The method of producing a reflecting surface by coating the surface of a vitreous body with a solid substance, then softening the surface to which the substance is attached causing the latter to be incorporated within the vitreous body.

8. The method of producing a reflecting surface by coating the surface of a vitreous body with a metallic substance, then softening only the surface to which the metallic substance is attached causing the latter to be absorbed thereby.

9. The method of producing a reflecting surface by coating the surface of a vitreous body with a metallic substance, then softening only the surface to which the substance is attached thereby causing the latter to sink into the fused surface.

10. The process of producing a mirror which consists in subjecting a metallic coated vitreous body to a high degree of heat to soften the body thereby causing the metallic coat to be incorporated within the same, then withdrawing and allowing the vitreous body to cool.

11. The process of producing a mirror which consists in subjecting a metallic coated vitreous body to a high degree of heat for a short duration which causes only the surface of the vitreous body to fuse and absorb the metallic coating.

12. The process of producing a mirror which consists in placing a metallic coated vitreous body into a previously heated oven, then suddenly raising the temperature to a high degree of heat which softens the surface of the vitreous body and causes the same to absorb the metallic coating, then withdrawing the body to allow the mass to cool.

13. The process of producing a mirror which consists in placing a metallic coated vitreous body into an oven heated previously to about 900 F., then suddenly raising the temperature to a higher degree of heat which softens only the surface of the vitreous body and causes the same to absorb the metallic coating, then withdrawing the said body to allow the mass to cool.

In testimony whereof I affix my signature in the presence of two witnesses.

CLARENCE L. TOMLINSON

Witnesses:
A. MUSGROVE ROBARTS,
MARY SCOTT TOMLINSON.